United States Patent [19]

Taka et al.

[11] 4,429,968

[45] Feb. 7, 1984

[54] AUTOMATIC FOCUS CONTROL DEVICE

[75] Inventors: Hideo Taka; Makoto Masunaga, both of Tokyo, Japan

[73] Assignee: Canon Kabushiki Kaisha, Japan

[21] Appl. No.: 398,183

[22] Filed: Jul. 14, 1982

[30] Foreign Application Priority Data

Jul. 22, 1981 [JP] Japan ............................... 56-114852
Jul. 22, 1981 [JP] Japan ............................... 56-114853

[51] Int. Cl.$^3$ ............................................... G03B 3/10
[52] U.S. Cl. ..................................................... 354/403
[58] Field of Search ............................................ 354/25

[56] References Cited

U.S. PATENT DOCUMENTS 3,442,193 5/1969 Pagel ..................................... 354/25

*Primary Examiner*—Michael L. Gellner
*Attorney, Agent, or Firm*—Toren, McGeady and Stanger

[57] ABSTRACT

In the disclosed device, a motion control apparatus effects relative movement between a projection arrangement that projects radiation toward an object and a sensing arrangement that senses radiation reflected by the object, and a processor receives an electrical output from the sensing arrangement to produce an output related to the range of an object. An arrangement between the motion control and the processor relates the processing operation to the relative movement produced by the motion control. According to an embodiment, a first stepping motor displaces a light projecting element stepwise in response to driving pulses from a first circuit while a second circuit processes the output of the light sensing element in relation to the output of the first circuit. A third circuit produces drive pulses for a stepping motor, that drives a movable lens, on the basis of the output of the second circuit.

50 Claims, 8 Drawing Figures

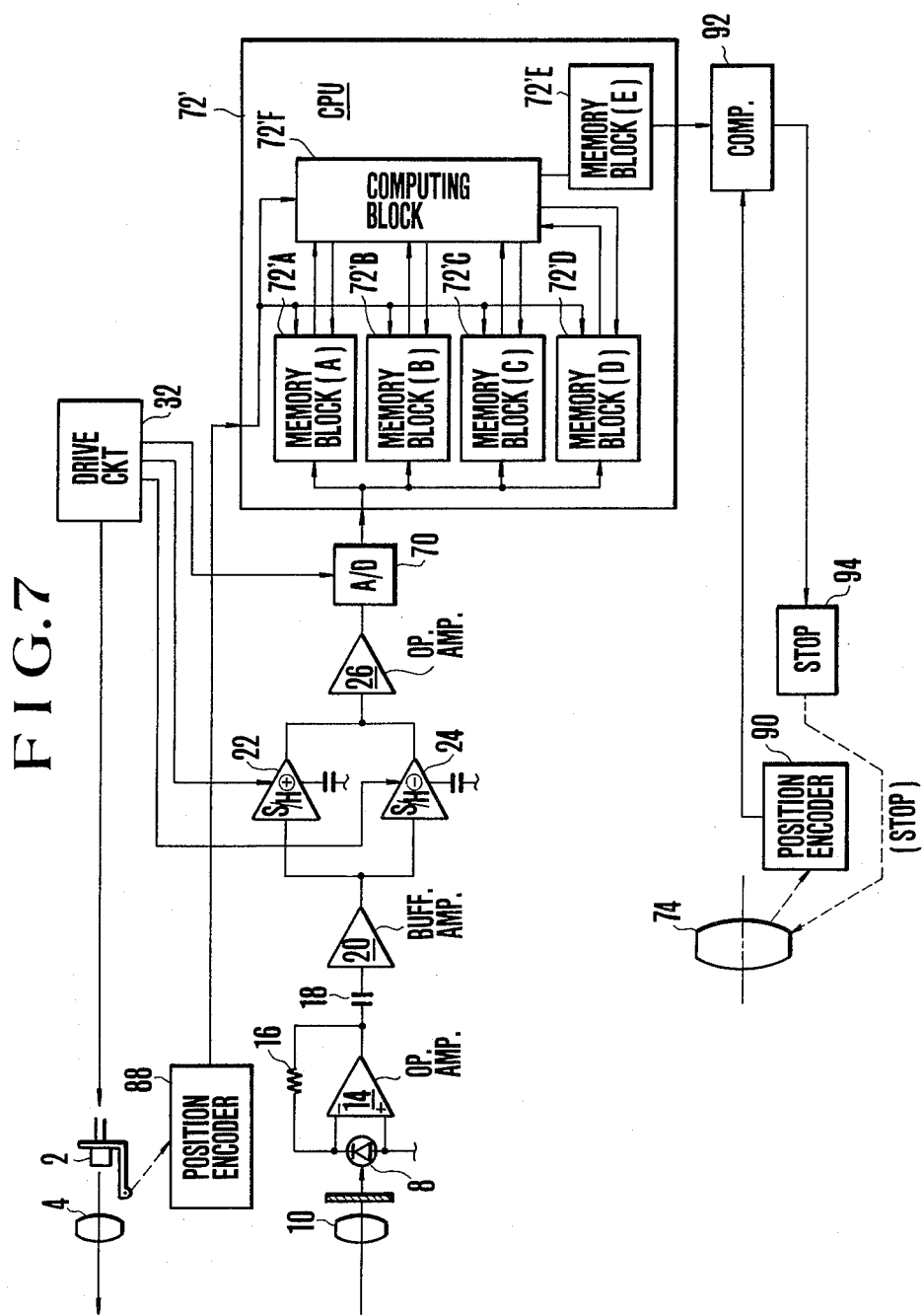

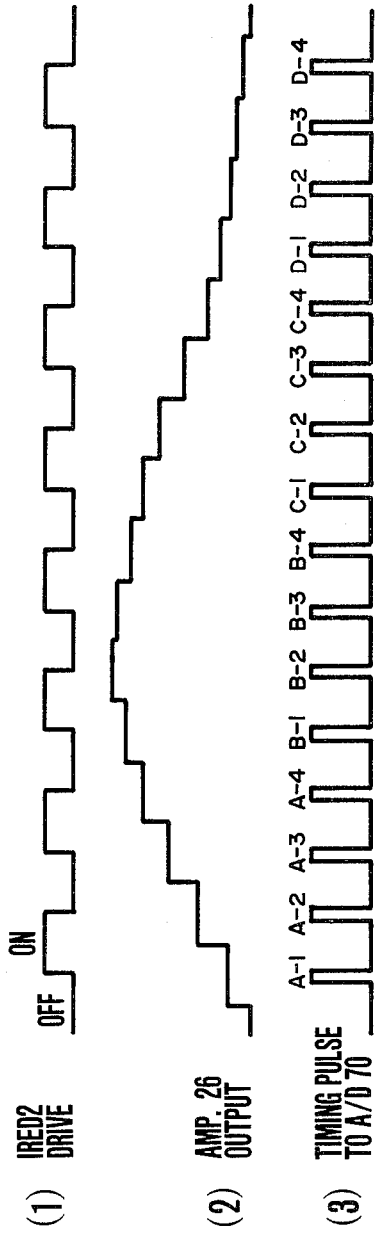

AUTOMATIC FOCUS CONTROL DEVICE

BACKGROUND OF THE INVENTION

Various kinds of automatic focus control devices of the so-called "active type" have been proposed and some of these have been put to practical use. Among these, active distance measuring devices project infrared rays. FIG. 1 schematically illustrates a typical example of a conventionally known measuring device which projects such infrared rays. Here, an infrared ray emitting diode 2 (hereinafter referred to as IRED for short) projects infrared light toward an object through a light projecting optical system 4. A light sensitive element 8 receives light reflected from the object through a light receiving optical system 10 and an infrared transmitting filter 12.

With the conventional device arranged in this manner, the IRED 2 is moved by some suitable known means, not shown, in the direction of arrow A from position a to another position b. The infrared light is projected along an optical path c when the IRED 2 is in position a and along another optical path d when the IRED is in the other position b. Therefore, the intensity of the infrared rays to be sensed by the light sensitive element 8 becomes the highest when the light is projected along an optical path e which encounters to the object 6 during the movement of the IRED 2. Assuming that the distance to the object 6 is to be measured on the basis of the principle of trigonometric distance measurement, the angle of projection, i.e. the moving position of IRED 2 at which the light sensitive element 8 most strongly senses the intensity of the infrared rays corresponds to the distance to the object. Since this operation is well known, description of further details of the operating principle of the conventional device are omitted herein.

The above description merely covers the principles of these conventional devices. However, in the actual application, the effects of external light cannot be ignored in spite of the use of the infrared transmitting filter 12. To solve this problem, in projecting the infrared light from the IRED 2, the infrared light is modulated and, in the meantime, the light sensitive element 8 is arranged to detect the reflected infrared light coming from the object by a synchronous detection process.

FIG. 2 shows an example of a circuit arrangement for this synchronous detection. This circuit includes a light receiving amplifier 14 which is arranged to produce an output by converting a photo current flowing through the light sensitive element 8 into a voltage through a feedback resistor 16; a capacitor 18 which eliminates the DC component of the output of the light receiving amplifier 14; a buffer amplifier 20 which determines the level of the AC component after elimination of the DC component; a drive circuit 32 which modulates the IRED 2 by causing it to flicker at a frequency of about 10 KHz; a sample and hold circuit 22 which is arranged to sample and hold the output of the buffer amplifier 20 when the IRED 2 is lit; another sample and hold circuit 24 which is arranged to sample and hold the output of the buffer amplifier 20 when the IRED 2 is extinguished and to produce an output by inverting it; an operational amplifier 26 which adds up the outputs of the sample and hold circuits 22 and 24; a capacitor 28 of a low-pass filter which eliminates the high frequency component of the output of the operational amplifier 26; and a buffer amplifier 30 for producing an output.

The operation of the circuit arrangement of the conventional device shown in FIG. 2 is as shown in the timing chart of FIGS. 3(1) to 3(9). FIG. 3(1) shows the on-and-off timing of the IRED 2. FIG. 3(2) shows the output signal of the light receiving amplifier 14. FIG. 3(3) shows the output signal of the buffer amplifier 20. FIG. 3(4) shows the sampling pulses to the sample and hold circuit 22. FIG. 3(5) shows the sampling pulses to the sample and hold circuit 24. FIG. 3(6) shows the sample and hold output signal of the sample and hold circuit 22. FIG. 3(7) shows the sample and hold output signal of the sample and hold circuit 24. FIG. 3(8) shows the output signal of the operational amplifier 26. FIG. 3(9) shows the output signal of the buffer amplifier 30.

When the reflected infrared rays strike the light sensitive element 8 according to the on-and-off operation of the IRED 2, a photo current in which an exterior light component and the reflected infrared light overlap each other flows through the light sensitive element 8. The photo current is voltage converted through the resistor 16 of the light receiving amplifier 14 into a voltage signal as shown in FIG. 3(2). The voltage signal then has its DC component eliminated through the capacitor 18 and the buffer amplifier 20 and is taken out as an AC signal as shown in FIG. 3(3). Meanwhile, the sample and hold circuits 22 and 24 to which this AC signal is to be supplied respectively receive pulse signals as shown in FIGS. 3(4) and 3(5). These signals are supplied to the circuits 22 and 24 according to the lighting and extinction timing of the IRED 2 as sampling pulses respectively. Accordingly, as a result of their sample and hold actions, the circuits 22 and 24 respectively produce sample and hold signals as shown in FIGS. 3(6) and 3(7).

The outputs of the sample and hold circuits 22 and 24 are added up at the operational amplifier 26. The output of the operational amplifier 26 is supplied to a low-pass filter as the wave form shown in FIG. 3(8). The low-pass filter, which consists of the capacitor 28 and the buffer amplifier 30, removes a ripple component from the input to give a wave form as shown in FIG. 3(9).

Therefore, the output of the buffer amplifier 30, while the IRED 2 is being moved in the direction of arrow A, constitutes a signal which reaches its peak when a light beam projected by the IRED 2 just impinges upon the object 6 whose distance is being measured. Then, it is possible either to measure distance or to allow a camera or the like to perform an automatic focus control action by correlating the peak position thus obtained with the moving position of the IRED 2.

However, the actual output of the low-pass filter consisting of the capacitor 28 and the buffer amplifier 30 is not always of a wave form completely devoid of a ripple component as shown in FIG. 3(9). Therefore, an erroneous peak might be detected before a correct peak position is found. To avoid incorrect action due to such erroneous peak detection, it has been practice to provide a dead zone for peak detection. In carrying out peak detection, a peak detection circuit according to the conventional practice first detects the peak of a wave form, such as the wave form shown in FIG. 3(9), for example, and then sees whether or not there appears an output that exceeds the detected peak within the predetermined period of time. If an output exceeding the first detected peak within the predetermined period of time appears, the first detected peak is determined as an error and the next peak is detected. Conversely, if an output that exceeds the peak after the lapse of the predetermined period does not appear, the peak detected first is determined as a correct peak.

The provision of a dead zone thus enables prevention of erroneous action due to erroneous peak detection. However, the provision of the dead zone results in a time lag. The time lag tends to cause an error in distance measurement or, in the case of an automatic focus control device, prolongs the length of time required for automatic focus control. In the case of a camera or the like, a photo taking lens is controlled after the lapse of a certain length of time after the actual occurrence of a peak. In view of this, the moving speed of the lens must be precisely controlled. This has necessitated the use of a governor or the like. Such an arrangement produces various inconveniences, such as a large noise produced when the photo taking lens moves, a large torque required for charging the automatic focus control system during winding of film and charging the camera, etc. Where a winding and charge-up action is accomplished by means of a motor or the like, the use of such an additional member imposes a large load. Further, in accordance with the prior art arrangement, the photo taking lens is moved concurrently with the movement of the IRED. This also has necessitated a complex structural arrangement for locking and unlocking a focusing system.

SUMMARY OF THE INVENTION

This invention is directed to the elimination of the above shortcomings and inconveniences of the prior art. It is therefore a general object of the invention to provide a novel automatic focus control device which obviates the above stated inconveniences of the prior art devices.

It is a more specific object of this invention to provide an active type infrared ray projecting automatic focus control device which is capable of preventing adverse effects of noises such as the ripple in a low-pass filter output, etc. without causing any time lag for peak detection; is capable of accurately controlling the moving speed of a lens without necessitating use of such a member as a governor; and is capable of controlling the lens to bring it into a correct peak position without recourse to provision of a dead zone for peak detection.

To attain the above stated object, a preferred embodiment of the invention comprises first driving means which displaces light projecting means in a stepwise manner; first circuit means which produces a driving signal for the first driving means; second circuit means which processes the output of light receiving means in relation to the output of the first circuit means; second driving means which drives movable lens means; and third circuit means which produces a driving signal for the second driving means in accordance with the output of the second circuit means.

Another embodiment of the invention comprises first detection means for detecting the moving position of light projecting means; first circuit means which processes the output of light receiving means in relation to the output of the first detection means; second detection means for detecting the moving position of movable lens means; second circuit means which controls the movement of the above stated lens means on the basis of the output of the first circuit means and that of the second detection means.

In these specific embodiments, the light projecting means is arranged to be movable. However, in accordance with the invention, a light projecting optical system which is disposed in front of the light projecting means may be arranged to be movable instead of moving the light projecting means. It is also possible to arrange at least one of a light receiving optical system and the light receiving means which jointly form a light receiving system to be movable while arranging the light projection system to be stationary. Anyway, what is essential in accordance with the invention is the provision of some means for effecting relative displacement between the reflected light coming from an object and the light receiving means.

The above and other objects and features of the invention will appear more fully hereinafter from the following description of embodiments thereof taken in connection with the accompanying drawings.

BRIEF DESCRIPTION OF THE DRAWINGS

FIG. 7 is a block diagram showing a further embodiment of the invention.

FIG. 8 is a timing chart showing the operation of the arrangement shown in FIG. 7.

DETAILED DESCRIPTION OF THE PREFERRED EMBODIMENTS

Figure 1:
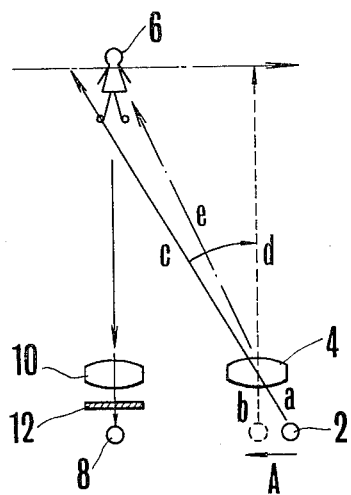
FIG. 1 is a schematic illustration showing the concept of the conventional active type infrared ray projecting distance measuring device.
Figure 2:
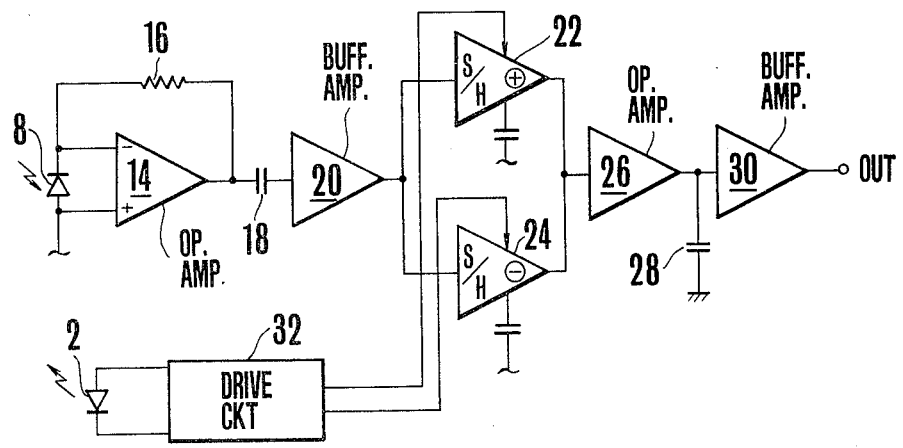
FIG. 2 is a circuit diagram showing an example of the synchronous detection circuit used in the arrangement shown in FIG. 1.
Figure 3:
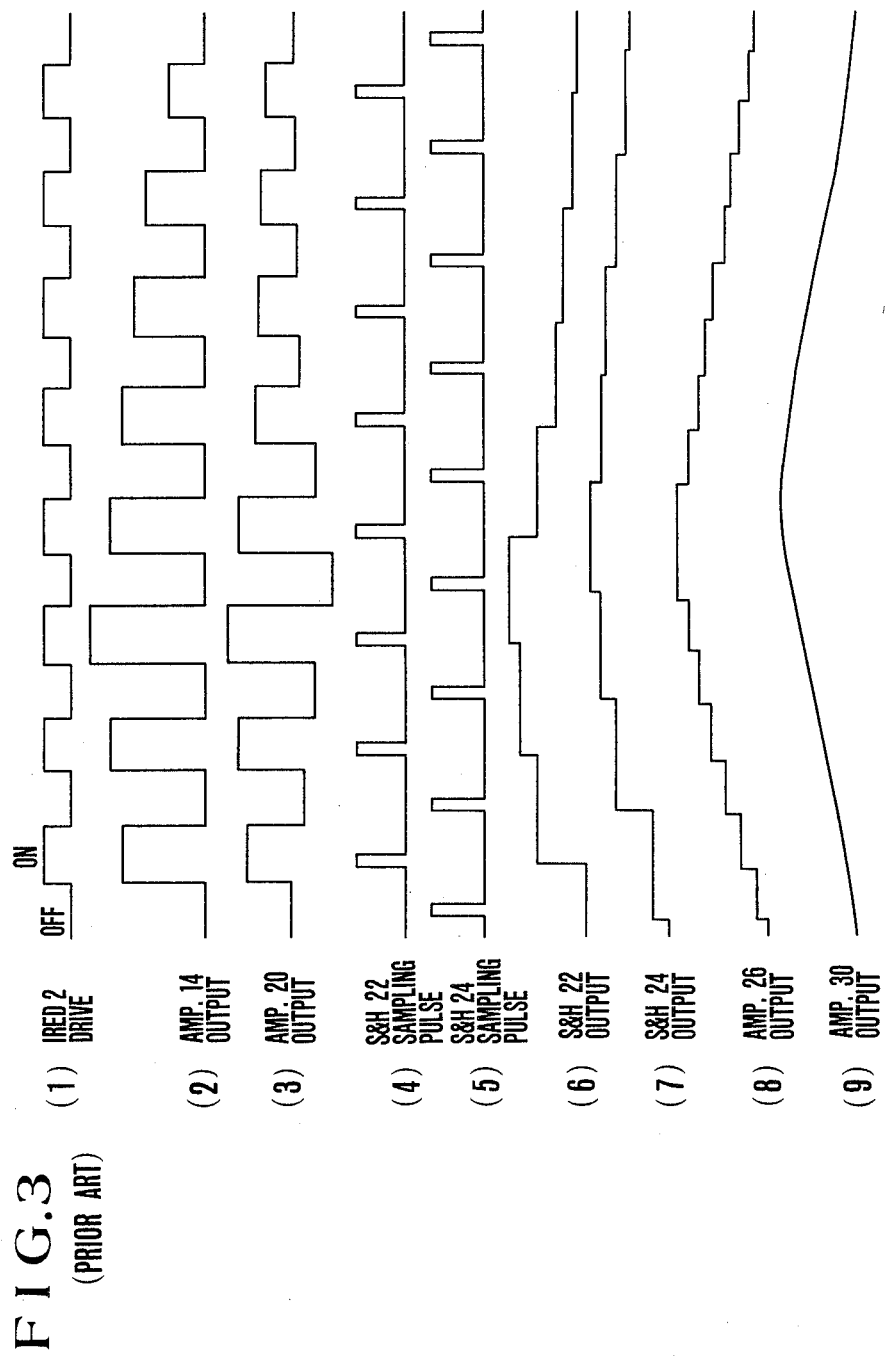
FIG. 3 is a timing chart showing the operation of the circuit arrangement shown in FIG. 2.
Figure 4:
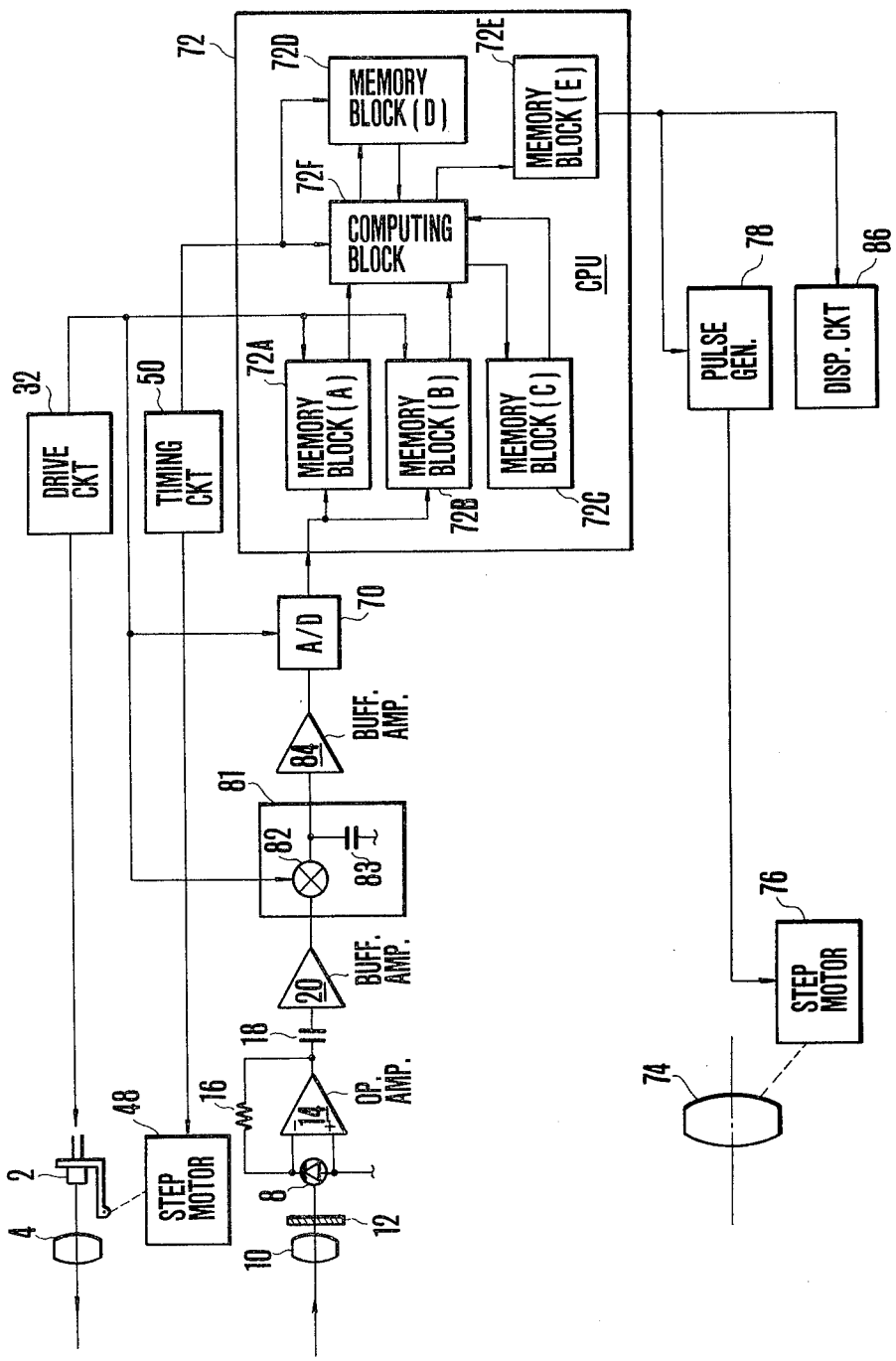
FIG. 4 is a block diagram of an embodiment of the present invention.

In FIG. 4, which shows a preferred embodiment of the invention, components indicated by the same reference numerals and symbols as those used in FIGS. 1 and 2 are identical with the corresponding components shown in FIGS. 1 and 2. This embodiment includes a stepping motor 48 (the first driving means) which is arranged to displace the IRED 2 from a predetermined start position to a predetermined end position; a timing circuit (50 which is the first circuit means mentioned in the foregoing) which produces pulses for the driving action of the stepping motor 48; an analog switch 82 which sample holds the output of the buffer amplifier 20 at a capacitor 83 in accordance with the sampling pulses from the drive circuit 32 in synchronism with the on-and-off operation of the IRED 2; a buffer amplifier 84 which supplies the output of a sample hold circuit 81 which is composed of the analog switch 82 and the capacitor 83 to an A/D converter 70; a CPU 72 (central processing unit, which is the second circuit means) which computes and processes the output of the A/D converter at every step of the stepwise driving action of the motor 48 caused by the timing circuit 50 to detect a peak of the output and is arranged to store a datum relative to a number of steps of the stepping motor 48 corresponding to the peak; a photo taking lens 74; another stepping motor 76 (the second driving means) which is arranged to move the photo taking lens 74 from a predetermined position in a predetermined direction; a pulse generating circuit 78 (the third circuit means) arranged to produce driving pulses for the stepping motor 76 corresponding to the number of steps stored at the CPU 72; and a display circuit 86 which is arranged to display the result of distance measurement.

Figure 5:
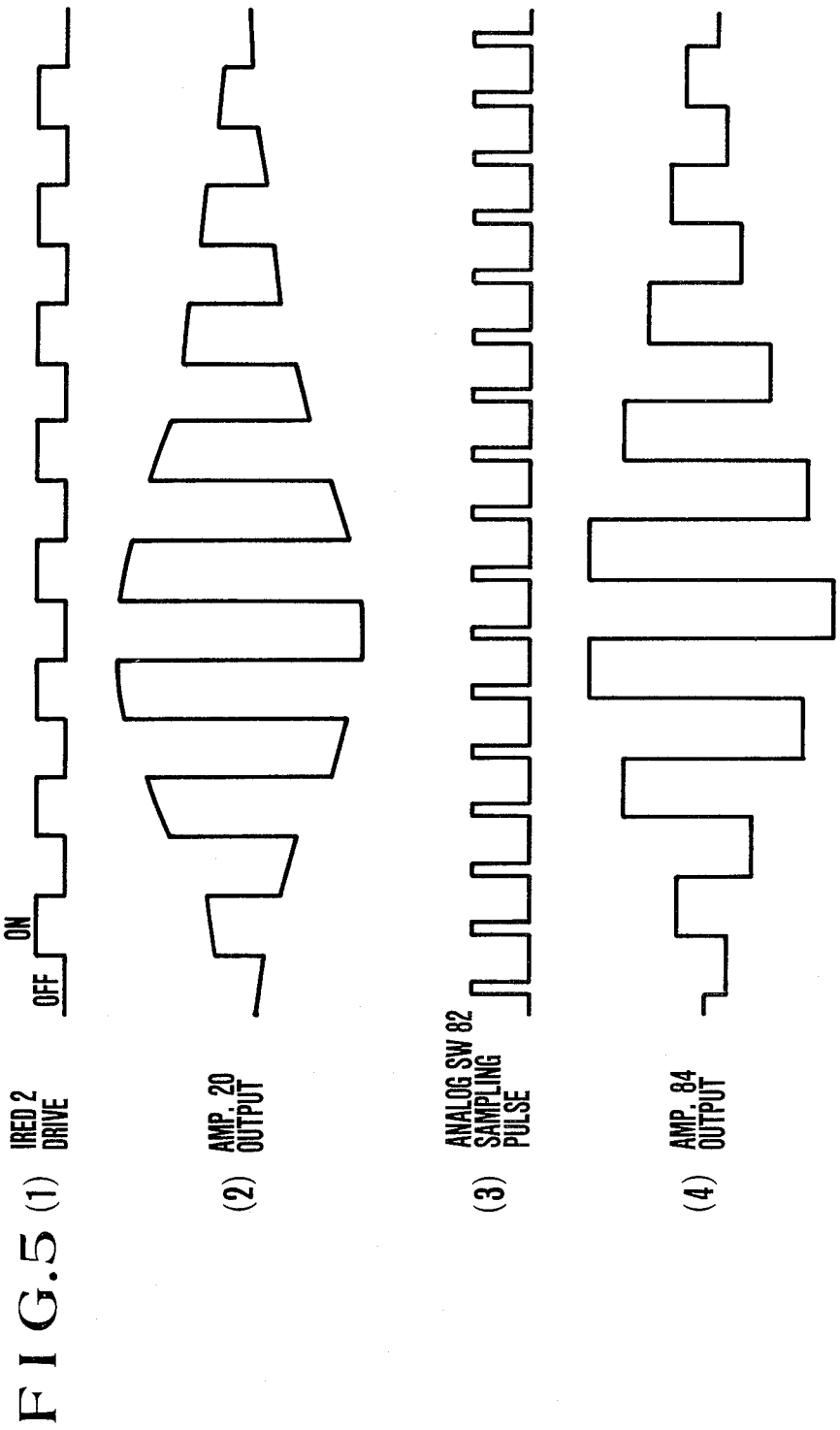
FIG. 5 is a timing chart showing the operation of the arrangement shown in FIG. 4.

The embodiment of FIG. 4 operates as shown in the timing chart of FIG. 5(1) to FIG. 5(4). FIG. 5(1) shows the on-and-off timing of the IRED 2; FIG. 5(2) the output signal of the buffer amplifier 20; FIG. 5(3) the sampling pulses for the analog switch 82; and FIG. 5(4) the output signal of the buffer amplifier 84. These wave forms are obtained when the IRED 2 is continuously moving.

The output signal of the buffer amplifier 84 is A/D converted by the A/D converter 70 at every step of the on-and-off operation of the IRED 2 which takes place according to the timing pulses from the drive circuit 32. At the CPU 72, the outputs of the A/D converter 70 obtained when the IRED 2 is on and the outputs thereof obtained when the IRED 2 is off are discretely taken at every step of the stepwise driving operation of the stepping motor 48 and are separately averaged at every predetermined number of steps, say, a number of steps between 4 and 10 to obtain an average value of the outputs of the A/D converter 70 obtained when the IRED 2 is on and another average value of the outputs thereof obtained when the IRED 2 is off. The latter average value is deducted from the former. Then, the driving step of the motor 48, i.e. the position of the IRED 2, at which the difference between the two average values becomes the largest is stored in the CPU 72. For this purpose, the CPU 72 includes five memory blocks 72A-72E and a computing block 72F. The memory block 72A stores a prescribed number of output data produced from the A/D converter 70 when the IRED 2 is on at every driving step of the motor 48, i.e. at every moving position of the IRED 2. Meanwhile, the memory block 72B stores the same number of output data produced from the A/D converter 70 when the IRED 2 is off. After completion of the storing action, the data stored at the memory block 72A and those stored at the memory 72B are discretely and immediately averaged by the computing block 72F. The average values thus obtained are stored at the memory block 72C respectively. After that, the stored average values are again read out and computed by the computing block 72F to obtain a difference between them. Each difference value (or datum) thus obtained is then stored at an address in the memory block 72D corresponding to the number of the above stated driving steps of the motor 48. This process is repeated during the movement of its IRED 2 from the start position to its end position at every step of a predetermined number of driving steps of the motor 48 for moving the IRED 2 from the start position to the end position thereof. This number of steps apparently corresponds to a number of divided zones for the range (or distance) detection. Each of the latest difference datum obtained through the repetition of the process is stored at a different address from another datum within the memory block 72D. Upon arrival of the IRED 2 at the end position, the CPU 72 reads out the data stored in the memory block 72D one after another. The computing block 72F of the CPU 72 then detects the largest datum and the address at which the largest datum is stored in the memory block 72D. This address is then stored at the memory block 72E. The datum stored at the memory block 72E indicates the driving step number of the motor 48 at which the light sensitive element 8 most strongly receives the reflection of the projected light of the IRED 2 coming from the object 6. In short, the datum stored at the memory block 72E represents the moved position of the IRED 2 and thus corresponds to the distance to the object 6. The reason for this is self-evident.

The display circuit 86 displays a distance corresponding to the datum of step stored at the memory block 72E of the CPU 72. The pulse generating circuit 78 supplies the stepping motor 76 with a number of pulses corresponding to the datum of step stored at the memory block 72E of the CPU 72. In response to this, the stepping motor 76 moves the photo taking lens 74 from a predetermined start position to an in-focus position to accomplish automatic focus control.

Resetting the IRED 2 and the lens 74 back to their predetermined start positions, may be accomplished in a suitable known manner such as causing the motors 48 and 76 to rotate in the reverse direction by a reset switch. In the case of a camera or the like, this may be accomplished by a charge-up action through a suitable means or arrangement.

Figure 6:
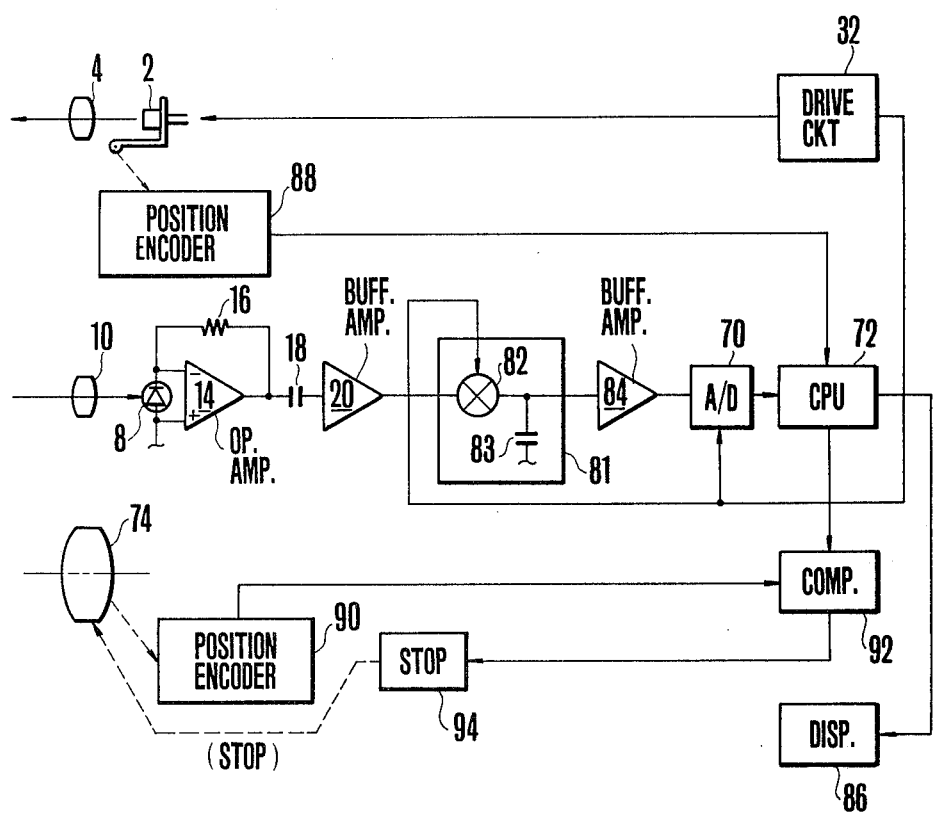
FIG. 6 is a block diagram showing another embodiment of the invention.

Another embodiment of the invention is shown in FIG. 6. In FIG. 6, the components of the embodiment indicated by the same reference numerals and symbols as those used in FIGS. 1, 2 and 4 are identical with the corresponding components shown in FIGS. 1, 2 and 4. In this embodiment, the stepping motor 48 which is used in the preceding embodiment shown in FIG. 4 for driving the IRED 2 is replaced with a known arrangement using a driving force of a spring or the like for moving the IRED 2. The moving position of the IRED 2 is detected by a first detecting means. The output signal of the first detecting means is supplied to the CPU 72 in place of the output signal of the timing circuit 50 which is used in the preceding embodiment shown in FIG. 4. The CPU 72 is arranged to process the output of the A/D converter 70 while correlating it with the moving position of the IRED 2. With regard to control over the lens 74, there is provided a second detecting means for detecting the moving position of the lens 74. The output of the second detecting means is compared with the output of the CPU 72 which is the datum stored at the memory block 72E as shown in FIG. 4 and the lens 74 is moved by a driving force of a spring or the like from a predetermined start position in a predetermined direction concurrently with this comparison. The focus control is accomplished by stopping the lens 74 when the output of the second detecting mean and the datum stored at the memory block 72E satisfy a predetermined relation.

Referring to FIG. 6, the embodiment includes a position detector or position encoder 88 (the first detecting means) arranged to produce an electrical output corresponding to the position of the IRED 2 in relation to the movement of the IRED 2. The position detector 88 is composed of, for example, a Gray code plate and a brush or a code plate and a photo-coupler, etc. The output of the position detector 88 is supplied to the CPU 72 in place of the output of the timing circuit 50 shown in FIG. 4. Further, the IRED 2 is arranged to be moved by a suitable known arrangement using a driving force of a spring or the like from a predetermined start position to a predetermined end position. Another position detector or encoder 90 (the second detecting means) also produces an electrical output corresponding to the position of the lens 74 in relation to the movement of the lens 74. The output of the position detector 90 (digital datum) is compared with the output of the CPU 72 (the datum stored at the memory block 72E) by a comparator 92, which produces a prescribed signal when the compared two data satisfy a prescribed relation (or when they coincide with each other, for example). The lens 74 is stopped by a stopping means 94, which is a suitable known arrangement including an electromagnet or the like, in response to the output of the above stated comparator 92. The lens 74 in this case is arranged to be moved by a suitable known arrangement using a driving force of a spring or the like from a predetermined start position in a predetermined direction as mentioned in the foregoing. For starting the movement of the lens 74, the lens may be started either by some suitable means upon arrival of the IRED 2 at its end position or may be started by some suitable operating means for starting it independently of the movement of the IRED 2.

Since the operation of this embodiment is similar to that of the embodiment shown in FIG. 4, the description thereof is omitted.

A further embodiment of the invention is shown in FIG. 7. In FIG. 7, the components of the embodiment indicated by the same reference numerals and symbols as those used in FIGS. 1, 2, 4 and 6 are identical with the corresponding ones shown in these drawings, with the exception of the CPU. The embodiment differs from the embodiments shown in FIGS. 4 and 6 merely in the arrangement of the CPU and in that the conventional arrangement shown in FIG. 1 is used for a part of the circuit arrangement up to the A/D converter 70. The CPU 72' of this embodiment comprises four memory blocks 72'A-72'D which are arranged to store the output of the A/D converter 70; a computing block 72'F which computes average values of the data stored at these memory blocks and is arranged to detect the largest value of the average data thus obtained and the memory block which stores the largest of the average data; and another memory block 72'E which is arranged to store a datum indicating the specific memory block thus detected.

The operation of the embodiment shown in FIG. 7 is shown in the timing charts and tables of data of FIGS. 8(1) to 8(5). FIG. 8(1) shows the on-and-off timing of the IRED 2. FIG. 8(2) shows the output signal of the operational amplifier 26. FIG. 8(3) shows timing pulses provided from the drive circuit 32 to the A/D converter 70 for effecting A/D conversion. The output of the operational amplifier 26 is converted into digital values in accordance with the timing pulses shown in FIG. 8(3). Meanwhile, in response to the output of the position detector 88, the CPU 72' stores the outputs of the A/D converter 70 at applicable addresses in the memory blocks 72'A-72'D corresponding to the moving position of the IRED 2. In FIG. 8(4), the memory blocks 72'A-72'D are respectively indicated as memory blocks A, B, C and D. The outputs of the A/D converter 70 are stored at the addresses of these memory blocks as shown in FIG. 8(4). Upon completion of the movement of the IRED 2, the CPU 72' stores the average value of the data stored at the addresses A-1-A-4 of the memory block A (72'A) at a prescribed address of the memory block A; the average value of the data stored at the addresses B-1-B-4 of the memory block B at a prescribed address of the memory block B; the average value of the data stored at the addresses C-1-C-4 of the memory block C at a prescribed address of the memory block C; and the average value of the data stored at the addresses D-1-D-4 of the memory block D at a prescribed address of the memory block D. FIG. 8(5) shows the average values of the data thus stored in the memory blocks A, B, C and D (or 72'A-72'D). The CPU 72' then discerns the magnitude of the average data stored at the memory blocks A, B, C and D (or 72'A-72'D) and responds to the memory block storing the largest average datum. Then, a datum which indicates this memory block is stored at the memory block E as a datum representing the position of the IRED 2 at which the output of the light sensitive element 8 reaches its maximum. Following this, suitable means begin moving the photo taking lens 74. A datum representative of the positions of the photo taking lens 74 is supplied from the position detector 90 to the comparator 92. The comparator 92 then compares it with the position datum supplied from the memory block 72'E of the CPU 72'. When the position of the photo taking lens 74 concides with the position datum obtained from the CPU 72', the photo taking lens stopping means 94 stops the photo taking lens 74 and contemplates performance of the automatic focus control.

As described in the foregoing, the automatic focus control device, according to the invention, is capable of moving the lens to a correct peak position without a peak detecting time lag which would result from a dead zone arranged to prevent ripple or the like at the output of a low-pass filter. It also accomplishes this end without requiring use of a member, such as a governor.

Because the invention simplifies the sample and hold circuit and dispenses with a low-pass filter, the entire circuit arrangement is simplified. Because the distance measuring operation is accomplished and its result is stored by moving only the IRED without moving the lens, the invention facilitates locking and unlocking of the focusing system.

What we claim:
1. A device comprising:
(A) means for projecting radiation toward an object;
(B) means for sensing the radiation reflected by and coming from the object and for producing an electrical output indicative of the intensity of the received radiation;
(C) means for effecting relative movement between the reflected radiation and said sensing means;
(D) means for processing the electrical output of said sensing means to produce an output related to an object range; and
(E) means arranged between said effecting means and said processing means for relating the output processing operation of the processing means to said relative movement between the radiation and said sensing means effected by the effecting means.

2. The device according to claim 1, wherein said relating means includes;
means coupled to said effecting means and to said processing means for producing and supplying to the processing means, an electrical signal related to the amount of said relative movement between the radiation and said sensing means effected by the effecting means.

3. The device according to claim 2, wherein said effecting means includes;
driving means operative in a stepwise manner to effect said relative movement;
and said coupled means includes;

signal generation means for generating and supplying to said driving means and to said processing means, electrical signals indicative of the amount of said relative movement to be effected by the driving means to control the operations of the driving means and of the processing means.

4. The device according to claim 3, wherein said driving means includes a step-motor, and said signal generation means includes a pulse generator.

5. The device according to claim 2, wherein said coupled means includes;
detecting means for detecting the amount of said relative movement between the radiation and said sensing means effected by said effecting means to produce said electrical signal.

6. The device according to claim 5, wherein said detecting means includes;
an encoder arranged to produce, as said electrical signal, a coded signal indicative of the amount of said relative movement.

7. The device according to claim 1 or 2 or 3 or 4 or 5 or 6, wherein said processing means is arranged to process the output of said sensing means every predetermined amount of said relative movement between the radiation and the sensing means effected by said effecting means.

8. The device according to claim 7, wherein said processing means includes;
memory means for memorizing the output of said sensing means every one of said predetermined amounts of said relative movement; and
operation means for producing said output related to the object range on the basis of the memorized outputs memorized in said memory means.

9. The device according to claim 8, wherein said memory means is arranged to memorize a predetermined plurality of the outputs of the sensing means at different times, every said predetermined amount of said relative movement, and said operation means is arranged to detect an average value of said outputs memorized in said memory means, every said predetermined amount of the relative movement and to detect a maximum value in the detected average values, so as to produce said range related output by determining the total amount of said relative movement till said maximum value is detected.

10. The device according to claim 9, wherein said processing means further includes;
conversion means for converting the output of said sensing means into digital data;
said memory means memorizes the digital data formed by said conversion means.

11. The device according to claim 10, further comprising:
modulation means for applying a predetermined modulation to the radiation to be projected by said projection means;
said conversion means being coupled to said modulation means and converting the output of said sensing means into the digital data in synchronism with said modulation of the radiation.

12. The device according to claim 8, wherein said processing means further includes;
conversion means for converting the output of said sensing means into digital data;
said memory means memorizes the digital data formed by said conversion means.

13. The device according to claim 12, further comprising:
modulation means for applying a predetermined modulation to the radiation to be projected by said projection means;
said conversion means being coupled to said modulation means and converting the output of said sensing means into the digital data in synchronism with said modulation of the radiation.

14. The device according to claim 9, further comprising:
movable lens means; and
focus control means for controlling the focus of said lens means with respect to the object on the basis of the output of said processing means.

15. The device according to claim 14, wherein said focus control means includes;
a motor for positioning said lens means to position indicated by the output of said processing means.

16. The device according to claim 15, wherein said motor is operative in a stepwise manner.

17. The device according to claim 14, wherein said focus control means includes;
a stopper means for stopping the movement said lens means at a position indicated by the output of said processing means.

18. The device according to claim 8, further comprising:
movable lens means; and
focus control means for controlling the focus of said lens means with respect to the object on the basis of the output of said processing means.

19. The device according to claim 18, wherein said focus control means includes;
a motor for positioning said lens means to a position indicated by the output of said processing means.

20. The device according to claim 19, wherein said motor is operative in a stepwise manner.

21. The device according to claim 18, wherein said focus control means includes;
a stopper means for stopping the movement said lens means at a position indicated by the output of said processing means.

22. The device according to claim 1 or 2 or 3 or 4 or 5 or 6, further comprising:
movable lens means; and
focus control means for controlling the focus of said lens means with respect to the object on the basis of the output of said processing means.

23. The device according to claim 22, wherein said focus control means includes;
a motor for positioning said lens means to a position indicated by the output of said processing means.

24. The device according to claim 23, wherein said motor is operative in a stepwise manner.

25. The device according to claim 22, wherein said focus control means includes;
a stopper means for stopping the movement said lens means at a position indicated by the output of said processing means.

26. A device comprising:
(A) means for projecting radiation toward an object;
(B) means for sensing the radiation reflected by and coming from the object and for producing an electrical output indicative of the intensity of the received radiation;

(C) means for moving said projection means to effect relative movement between the reflected radiation and said sensing means;
(D) means for processing the electrical output of said sensing means to produce an output related to an object range; and
(E) means for relating the output processing operation of the processing means to the movement of said projection means effected by moving means.

27. The device according to claim 26, wherein said relating means includes;
means for producing and supplying to said processing means, an electrical signal related to the amount of the movement of said projection means effected by said moving means.

28. The device according to claim 27, wherein said moving means includes;
driving means operative in a stepwise manner to move said projection means;
and said supply means includes;
signal generation means for generating and supplying to said driving means and to said processing means, electrical signals indicative of the amount of the movement of said projection means to be effected by the driving means to control the operations of the driving means and of the processing means.

29. The device according to claim 28, wherein said driving means includes a step-motor, and said signal generation means includes a pulse generator.

30. The device according to claim 27, wherein said supply means includes;
detecting means for detecting the amount of the movement of said projection means effected by said moving means to produce said electrical signal.

31. The device according to claim 30, wherein said detecting means includes;
an encoder arranged to produce, as said electrical signal, a coded signal indicative of the amount of the movement of said projection means.

32. The device according to claim 26 or 27 or 28 or 29 or 30 or 31, wherein said processing means is arranged to process the output of said sensing means every predetermined amount of the movement of said projection means effected by said moving means.

33. The device according to claim 32, wherein said processing means includes;
memory means for memorizing the output of said sensing means every one of said predetermined amounts of the movement of said projection means; and
operation means for producing said output related to the object range on the basis of the memorized outputs memorized in said memory means.

34. The device according to claim 33, wherein said memory means is arranged to memorize a predetermined plurality of the outputs of the sensing means at different times, every said predetermined amounts of the movement of said projection means, and said operation means is arranged to detect an average value of said outputs memorized in said memory means, every said predetermined amount of the movement of the projection means and to detect a maximum value in the detected average values, so as to produce said range related output by determining the total amount of the movement of the projection means till said maximum value is detected.

35. The device according to claim 34, wherein said processing means further includes:
conversion means for converting the output of said sensing means into digital data;
said memory means memorizes the digital data formed by said conversion means.

36. The device according to claim 35, further comprising:
modulation means for applying a predetermined modulation to the radiation to be projected by said projection means;
said conversion means being coupled to said modulation giving means and converting the output of said sensing means into the digital data in synchronism with said modulation of the radiation.

37. The device according to claim 33, wherein said processing means further includes;
conversion means for converting the output of said sensing means into digital data; and wherein
said memory means memorizes the digital data formed by said conversion means.

38. The device according to claim 37, further comprising:
modulation means for applying a predetermined modulation to the radiation to be projected by said projection means;
said conversion means being coupled to said modulation giving means and converting the output of said sensing means into the digital data in synchronism with said modulation of the radiation.

39. The device according to claim 34, further comprising:
movable lens means; and
focus control means for controlling the focus of said lens means with respect to the object on the basis of the output of said processing means.

40. The device according to claim 39, wherein said focus control means includes;
a motor for positioning said lens means to position indicated by the output of said processing means.

41. The device according to claim 40, wherein said motor is operative in a stepwise manner.

42. The device according to claim 39, wherein said focus control means includes;
a stopper means for stopping the movement said lens means at a position indicated by the output of said processing means.

43. The device according to claim 33, further comprising:
movable lens means; and
focus control means for controlling the focus of said lens means with respect to the object on the basis of the output of said processing means.

44. The device according to claim 43, wherein said focus control means includes;
a motor for positioning said lens means to a position indicated by the output of said processing means.

45. The device according to claim 44, wherein said motor is operative in a stepwise manner.

46. The device according to claim 43, wherein said focus control means includes;
a stopper means for stopping the movement said lens means at a position indicated by the output of said processing means.

47. The device according to claim 26 or 27 or 28 or 29 or 30 or 31, further comprising:
movable lens means; and
focus control means for controlling the focus of said lens means with respect to the object on the basis of the output of said processing means.

48. The device according to claim 47, wherein said focus control means includes;
a motor for positioning said lens means to position indicated by the output of said processing means.

49. The device according to claim 48, wherein said motor is operative in a stepwise manner.

50. The device according to claim 47, wherein said focus control means includes;
a stopper means for stopping the movement said lens means at a position indicated by the output of said processing means.

* * * * *